Dec. 24, 1968   R. D. RUMSEY   3,417,669
ROTARY ACTUATOR CONTROL CIRCUIT MEANS
Original Filed July 10, 1963   4 Sheets-Sheet 1

INVENTOR.
Rollin Douglas Rumsey
BY
Hill, Sherman, Meroni, Gross & Simpson
ATTORNEYS Dec. 24, 1968    R. D. RUMSEY    3,417,669
ROTARY ACTUATOR CONTROL CIRCUIT MEANS
Original Filed July 10, 1963    4 Sheets-Sheet 2

Fig.5

INVENTOR.
Rollin Douglas Rumsey
BY
Hill, Sherman, Meroni, Gross & Simpson
ATTORNEYS

United States Patent Office 3,417,669
Patented Dec. 24, 1968

3,417,669
ROTARY ACTUATOR CONTROL CIRCUIT MEANS
Rollin Douglas Rumsey, Buffalo, N.Y., assignor to Houdaille Industries, Inc., Buffalo, N.Y., a corporation of Michigan
Application Sept. 27, 1965, Ser. No. 490,582, which is a division of application Ser. No. 293,997, July 10, 1963. Divided and this application Sept. 19, 1967, Ser. No. 668,791
8 Claims. (Cl. 91—421)

ABSTRACT OF THE DISCLOSURE

A hydraulic rotary actuator has means for supplying and exhausting hydraulic fluid alternatively with respect to the subchambers therein to effect relative oscillations of the shaft and the body of the actuator and the hydraulic circuitry has flow control valving functioning in response to overload on one exhaust side of the system to shut off the hydraulic supply to the other side of the system, and during reversals in the supply/exhaust relationship controlling exhausting fluid to bypass through a check valve.

---

This application is a division of my pending application Ser. No. 490,582, filed Sept. 27, 1965 which is a division of my pending application Ser. No. 293,997, filed July 10, 1963.

This invention relates to improvements in hydraulic control circuits for rotatry actuators utilized as motors or powering means such as for motivating hinges for doors and hatch covers, various agricultural and construction machinery uses, earth moving equipment including buckets, dippers, dredges, bulldozers, backhoes, and the like.

In many such applications of the rotary actuators, loads may vary substantially, hydraulic pressures may fluctuate, slamming at cycle terminus may be a problem, and, in general, excessive pressures may tend to develop. For example, pressure on the exhaust side of the system may reach a higher level than the inlet or supply pressure which nevertheless continues to add its thrust to the stopping or exhaust pressure, developing excessive pressures on the apparatus, seals, and the like.

An important object of the present invention is to provide new and improved control means for hydraulic rotary actuators.

Another object of the invention is to provide in a hydraulic actuator assembly a new and improved speed control system and more particularly a hydraulic valving circuit to control operational speed, eliminate slamming, and prevent excessive pressures from being generated in the actuator assembly.

Still another object of the invention is to provide new and improved hydraulic control means for hydraulic actuators functioning both during relatively heavy load operation of the actuator and during relatively lighter load condition of the actuator and which may occur in opposite cycles of the actuator.

Other objects, features and advantages of the present invention will be readily apparent from the following detailed description of certain preferred embodiments thereof, taken in conjunction with the accompanying drawings, in which:

FIGURE 5 is an end elevational view of a dual actuator hinge assembly;

Figure 1:
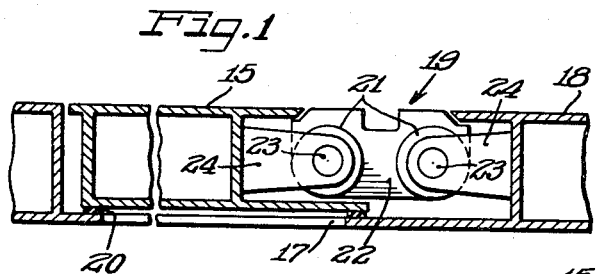
FIGURE 1 is a fragmental sectional elevational schematic view showing an adaptation of the invention to a hatch or like cover hinge construction.
Figure 2:
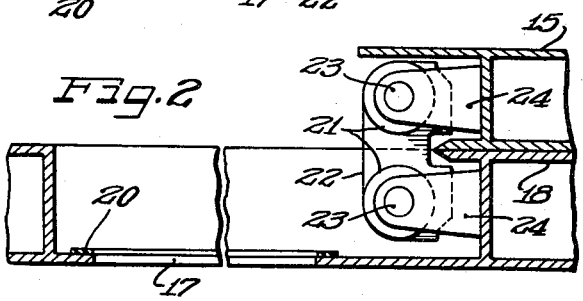
FIGURE 2 is a similar view showing the cover open.

In an illustrative use of actuators embodying the present invention, as shown in FIGURES 1 and 2, a closure member or door or cover 15 for closing an opening 17 in a deck, or wall or bulkhead 18 is mounted to be opened and closed by powered means comprising a dual actuator hinge assembly 19. A gasket 20 provides a watertight seal between the closed door or cover 15 and the deck or wall 18. The arrangement shown is especially suitable for hatch covers on cargo vessels.

In order to enable the cover or door 15 to be flush with the deck or wall 18 in the closed position and yet to be swung completely open through 180° to lie in an out-of-the-way position flush or flat against the deck or wall or side 18, the motor or powered hinge assembly 19 comprises two rotary vane hydraulic actuators 21 secured rigidly together in side-by-side parallel relation as by means of one or more connecting members or plates 22. Wing shafts 23 of the actuators are fixedly attached to respective brackets 24 secured to the adjacent edge structure of the closure member 15 at one side of the hinge unit and to the adjacent opposed side edge structure of the deck or wall 18.

Figure 3:
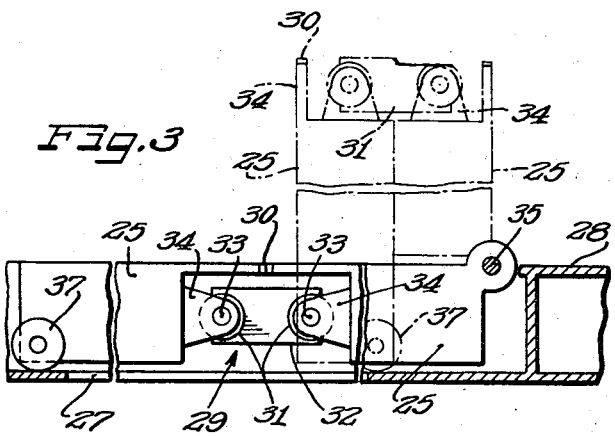
FIGURE 3 is a similar view showing a modification embodying an intermediately hinged cover or other closure.

For situations in which extra large openings are desirably closed by foldable, accordion hinged closure members or panels, the arrangement exemplified in FIGURE 3 may be utilized. In this construction, a plurality of closure members 25 for closing an opening 27 such as a hatchway in a deck or bulkhead or ship side 28 is hingedly connected by a power or motor hinge assembly 29, with gaskets 30 sealing the joint between the closure members in the closed position thereof. Small diameter rotary actuators 31 are secured rigidly in side-by-side parallel relation by connecting means 32 and have respective wing shafts 33 fixedly secured to brackets 34 which are mounted on the respective opposed edge structures of the closure panel members 35. The construction and relationship is such that when the actuators 31 are activated they operate through a full 90° each in the same angular direction whereby to fold the closure members 25 from a substantially flush relationship with the outer or upper face of the deck or wall 28 into a face-to-face folded relationship as shown in dot dash outline, the endmost of the series of closure panel members being hinged as at 35 to the structure 28, and the remaining closure panel or panels having anti-friction roller means 37 engageable with the rim about the opening 27.

Figure 4:
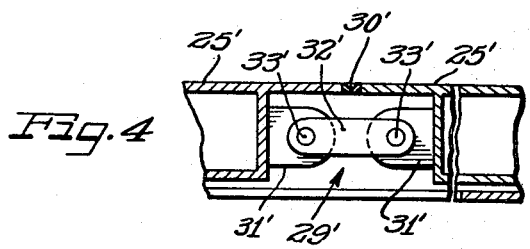
FIGURE 4 is a similar view showing still another modification.

Instead of the rotary actuator stators or housing being connected together as a unit and the wing shafts being attached to the relatively movable members of the closure member and deck or wall structures, the actuator housings may be mounted fixedly on the respective edge structures of the closure member and deck or wall member, or on the opposed adjacent edges of foldable closure members. Such an arrangement is shown in FIGURE 4 demonstrating the mounted actuator housing and connected wing shaft arrangement in a construction similar to that of FIGURE 3, primed reference numerals being applied to show the similarity of structure, but it will be understood that this same hinge 29' arrangement may be employed in a construction as in FIGURES 1 and 2 where the powered hinge is the direct hinge connection between the closure member and the deck or wall with which associated. In the illustrated arrangement of FIGURE 4, the actuator housings 31' are fixedly secured to the opposed adjacent edges of the closure members 25' and the connecting means 32' rigidly connects the wing shafts 33' of the actuators.

In any of the representative arrangements described, the actuators may be controlled to function in sequence or simultaneously, one actuator may be longer than the other, or of somewhat difference in size, as desired or as deemed advisable for accommodating various design or functional requirements or preferences.

Figure 6:
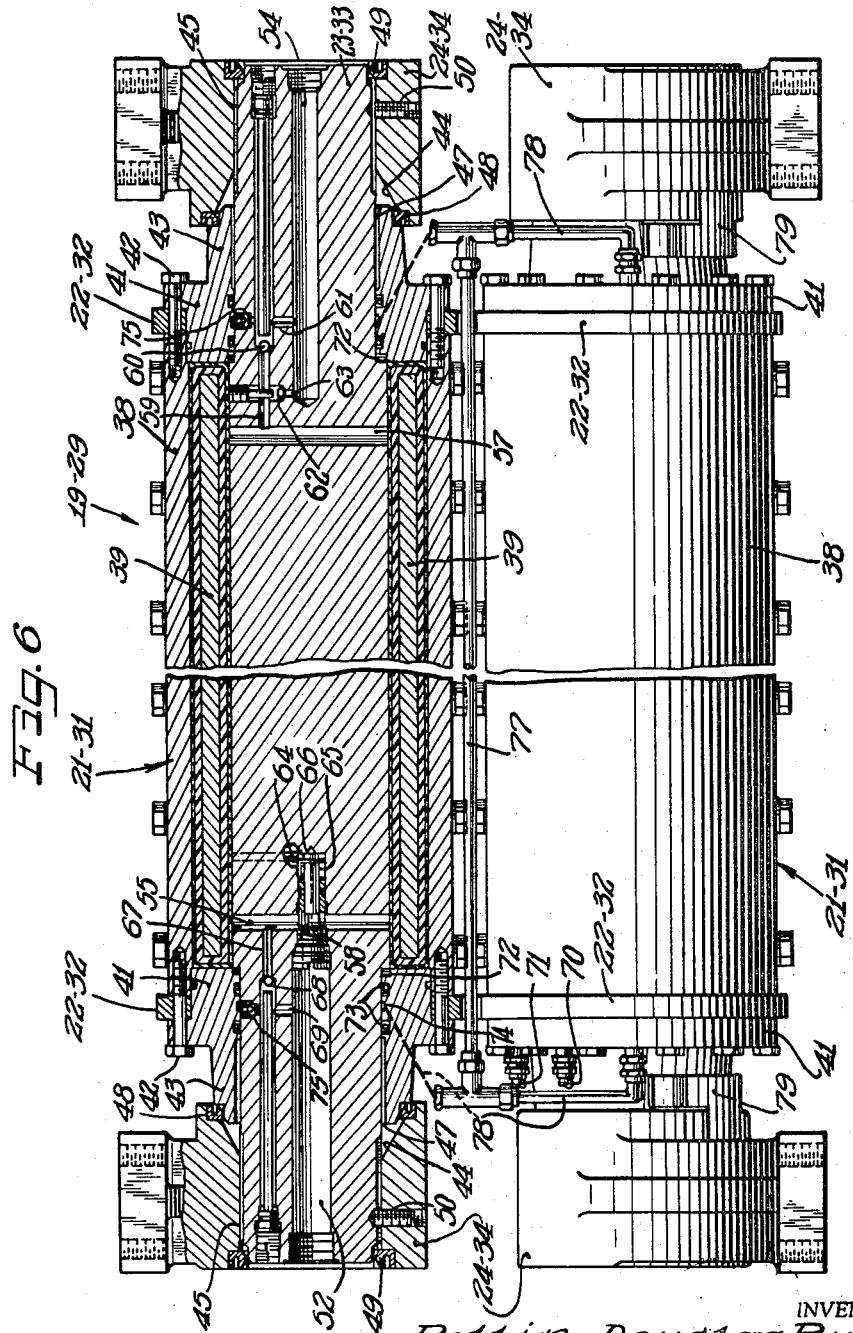
FIGURE 6 is a fragmental longitudinal sectional elevational detail view taken substantially on the line VI—VI of FIGURE 5.

By way of more detailed disclosure, there has been depicted in FIGURES 5 and 6 one practical construction of a tandem or dual rotary hydraulic actuator hinge unit assembly, identified as 19-29 to indicate the relationship to the illustrative embodiments of FIGURES 1 and 3. The hinge unit includes the elongated relatively small diameter actuator housing or stator units 21-31 rigidly connected in side-by-side parallel relation by the connecting plate members 22-32, while the wing shafts 23-33 are fixedly secured to the mounting brackets 24-34. It will be observed that the actuator housings are secured together at both opposite ends and the wing shafts have opposite end portions which project to the same extent beyond the opposite ends of the housing in each instance.

Figure 7:
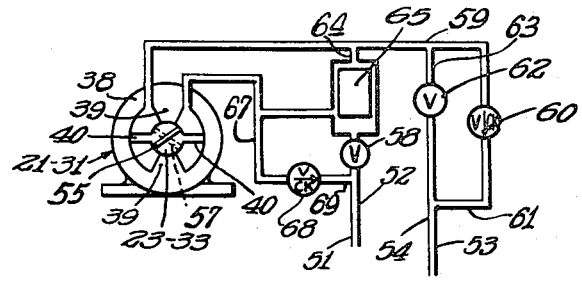
FIGURE 7 is a schematic view showing hydraulic control circuitry employed in the actuators of FIGURES 5 and 6.

Each of the actuators of the unit 19-29 is of the dual vane type wherein the housing 21-31 comprises a cylindrical casing 38 defining a working chamber subdivided by opposite fixed abutments 39 into subchambers within which opposite vanes 40 of the wing shaft 23-33 operate (FIGS. 6 and 7). End closures 41 are secured as by means of screws 42 to each end of the body casing 38. The screws also serve as shear pin connectors for the connecting plate members 22-32, as shown in FIGURE 6, by having the plate members clamped between flange portions of the end closures and the respective ends of the tubular body 38.

Since one of the problems on ocean-going ships and the like is corrosion due to sea water, means are provided for effectively protecting the joints of the assembly against entry of the water or other contaminating material. To this end, the end closure or cap members 41 have an annular outward flange extension 43 which has a tapered tip projecting into a flaring annular mouth 44 of the adjacent end of the bracket 24-34 into which the extremity portion of the wing shaft 23-33 projects and is keyed as by means of splines 45. About the wing shaft within the flange 43 and the flaring mouth 44 is provided an annular grease chamber 47. This grease chamber is closed from the outside at the joint between the end of the flange 43 and the mouth 44 by a grease seal 48. Another grease seal 49 is mounted at the outer end of the assembly to protect the spline joint between the shaft and the mounting bracket. Unintended endwise displacement of the wing shaft relative to the brackets 24-34 is avoided by set screws 50.

An important advantage of the general arrangement disclosed utilizing rotary actuators resides in that rotary joints and flexible hoses are avoided in the hydraulic lines which feed the actuators, but solid hydraulic lines may be connected directly into the ends of the stationarily mounted shaft of one of the actuators and crossported through the housings of the companion actuators. To this end, the wing shaft 23-33 of one of the actuators 19-29 is adapted to have a hydraulic source/exhaust line conduit 51 (FIG. 7) connected to the outer end of a counterbore 52 extending axially thereinto from one end (FIG. 6). At the opposite end of the same wing shaft is a hydraulic source/exhaust fluid communication line or duct 53 connected with the outer end of an elongated counterbore 54. These shaft end counterbores 52 and 54 communicate suitably with the subchambers of the actuator working chamber through cross bores or ports 55 and 57, respectively, transversely through the wing shaft. In this instance, the inner end portion of the hydraulic fluid bore 52 communicates with the cross port or passage 55 through a valve 58 mounted in the intersection of the bores and desirably of the adjustable orifice type although it could under other circumstances be of the needle type. This arrangement is especially suitable for hydraulic fluid introduced into the actuators to effect opening or swinging movement of the door or other pivotally mounted member relative to the structure on which mounted such as a deck, wall or other structure. Thereby pressure fluid is introduced into the two divisions of the subchambers to which the cross bore 55 is ported. At the same time, hydraulic fluid in the remaining two subdivisions of the working chamber to which the cross bore 57 is ported are pressure relieved or exhausted through this cross bore to and through the axial end bore 54, by way of an eccentrically disposed generally axially extending passage bore 59, an adjustable check valve 60 and a port 61.

To drive the actuators in the opposite direction, that is to close the associated door or swing some other associated hinged member in a return direction, pressure is introduced through the bore 54, which closes the check valve 60 and opens a control valve 62 mounted in a port 63 leading to the bore 59 beyond the check valve 60, thereby pressurizing the working subchambers to which the cross bore 57 leads. At the same time, such pressure bleeding off through a communicating cross bore or passage 64 by reference drives a piston valve 65 from the bottom of blind end bore 66 into closing relation to the valve 58, whereby the hydraulic fluid from the working subchambers to which the cross bore 55 leads is compelled to drain off through a bypass comprising an axial bore 67 leading from the cross bore 55, and past an adjustable check valve 68 and by way of a lateral port 69 into the bore 52 which is now on the low pressure or drain-off side of the system. Further, as will be readily apparent, by virtue of the fact that the valve 65 is referenced to the passage 54, 59, such valve will during exhaust flow through these passages respond to any greater pressure therein than the supply pressure through the passage 52 to close the passage 52 against further supplying of hydraulic fluid, to relieve the actuator of supply pressure load until the exhaust pressure is lower than the supply pressure and releases the valve 65. The schematic relationship of the several passages, bores and valves is shown in FIGURE 7.

This arrangement is quite advantageous where heavy weights are to be swung, especially from and to and through a vertical plane from a horizontal plane, such as in hatch covers, and the like, where a large torque variation takes place from zero as in a vertical position to maximum in or adjacent to the horizontal position. Such loads when controlled only by fixed orifice speed control valves have a tendency to slam the position nearest the the maximum torque such as when moving from a vertical position into a horizontal position. When proceeding from vertical to horizontal, if a fixed upstream pressure is applied, the pressure in the restraining actuator chambers frequently becomes excessive because it is the sum of the supply pressure and the pressure generated by the weight. For example, if 2500 p.s.i. is required to raise the weight in a 3000 p.s.i. system, on the downstroke the actuator chamber pressure would be 5500 p.s.i. When a snubbing valve is added to the system, this pressure could go much higher. An additional very important feature of the invention is therefore apparent in the instant control circuit which is capable of minimizing this pressure build up and at the same time providing constant actuation velocity in spite of variable load.

Although the description of the pertinent hydraulic circuitry and controls to accomplish the intended purposes has been in respect to only one of the hydraulic actuators as in FIGURES 6 and 7, it will be understood that the same results are attained in the hydraulic actuator paired up with the actuator that has the circuitry and valving in the wing shaft thereof. This is effected by crossporting through the housings of the paired actuators by means of respective conduits or ducts 70 and 71 (FIGS. 5 and 6), in this instance communicating through ports in the respective end closures 41 of the actuator but may, if preferred, be ported directly through the body cylinders 38. One of the conduits 70 and 71 interconnects corresponding working subchambers of the actuators crosspassaged through the respective wing shafts, while the other of these conduits connects the remaining crosspassaged sets of working subchambers. Thereby, both of the actuators are driven by the same hydraulic fluid source and system acting through but one of the actuators.

In order to prevent hydraulic fluid leakage from within the actuators under the considerable hydraulic pressures generated in operation, an improved system of seals and pressure relief means are provided. To this end, each of the actuators has an annular high pressure seal 72 between the inner face of each of the end closure cap members 41 and the wing shaft and providing a primary barrier against leakage of hydraulic fluid from the working chamber area within the actuator outwardly past the wing shaft (FIG. 6). Then a secondary, pressure relieved antileakage barrier is provided between the opposed cylindrical surfaces of the wing shaft and the closure member 41 in each instance outwardly beyond but adjacent to the high pressure seal 72, and comprising, in each instance, an axially spaced pair of annular seals 73 having an annular fluid collecting groove 74 therebetween. Conveniently the seals 73 and the groove 74 are provided in the cylindrical surface of the closure member 41.

Leakage into the area between the secondary seals 73 is drained into the lower pressure or bleed-off side or end of the hydraulic operating system. For this purpose the actuator 21–31 carrying the hydraulic circuitry and valving in its wing shaft 23–33 has a check valved port 75 communicating with each of the collecting grooves 74 and the respective ports 61 and 69 leading into the supply line passage bores 54 and 52, respectively. Through this arrangement, the respective check valve in the communicating port 75 closes against actuator motivating hydraulic pressure but opens and permits drainage in the low pressure or bleed-off condition. Thus, the check valve drain system always selects the lower pressure.

In order to equalize drain-off from each end of each of the actuator secondary leakage seals, a system of connecting conduits is provided including a longitudinally extending conduit 77 having branches 78 at its opposite ends ported through the end closure members 41 to communicate with the drain-off or collecting grooves 74. Thereby, all of the collecting grooves 74 are at all times connected to the lowest pressure or drain-off lines of the hydraulic operating system.

Overtravel of the actuators is avoided and thereby internal damage prevented, by suitable stop means, herein comprising mechanical limit stops 79 rigidly carried by the mounting brackets 24–34 (FIGS. 5 and 6), and opposing limit stop members rigidly carried by the end closure members 41. Through this arrangement, each of the actuators is limited to 90° travel, for a total of 180° travel of the unit 19–29 in an opening direction.

Figure 8:
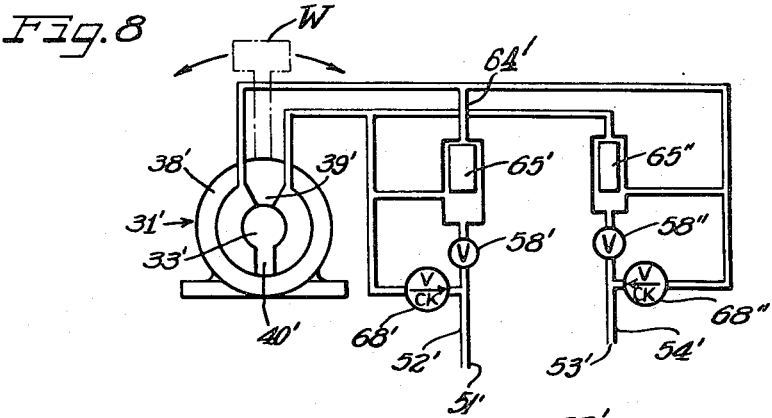
FIGURE 8 is a schematic view depicting the hydraulic circuitry employed in a single vane actuator embodiment of the invention.
Figure 9:
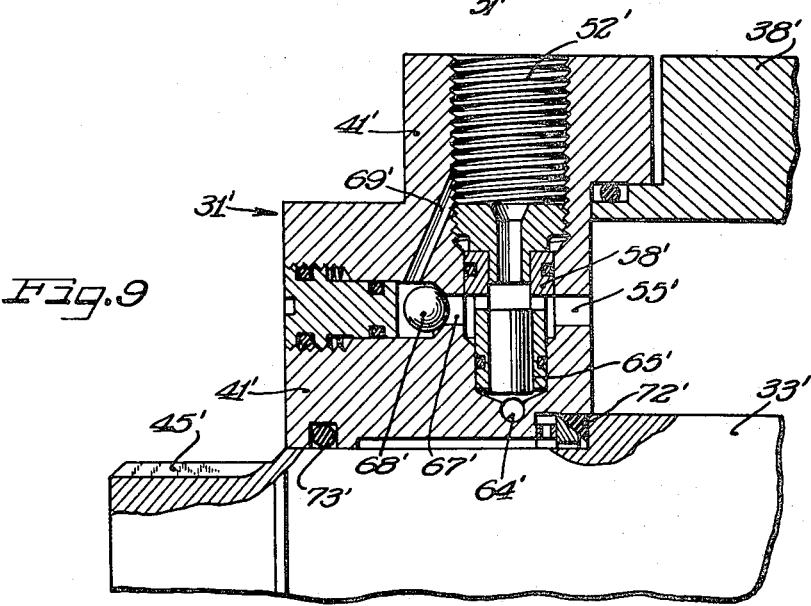
FIGURE 9 is a fragmentary sectional detail view disclosing a practical embodiment of the hydraulic circuitry of either of FIGURES 7 or 8 in an actuator-mounted arrangement as in FIGURE 4.

For some purposes one or more single vane actuators having 180° capability may desirably be employed. Such an actuator and hydraulic control circuitry minimizing pressure build up while at the same time providing constant actuation velocity in spite of variable load is depicted in FIGURES 8 and 9. Basically, the hydraulic circuit comprises duplicating the control valves 58 and 65 in both of the supply lines to the actuator since the actuator will be subject to the additional pressure generated by weight at each end of the oscillating actuating strokes involving the actuated member W exemplified in FIGURE 8. Where the wing shaft of the actuator is to be mounted in fixed relation to the associated structure by means such as the brackets 24–34 of FIGURES 1–3, the wing shaft passages and valve mounting as disclosed in connection with FIGURE 6, but with the valve arrangement 58–65 in both ends of the wing shaft, will afford the pneumatic circuitry and valving schematically depicted in FIGURE 8. However, where the actuator body is mounted fixedly in respect to the associated structure as described in connection with FIGURE 4 so that the wing shaft of the stationarily or fixedly mounted actuator is driven to rotate relative thereto, the arrangement is desirably as depicted in FIGURE 9 wherein the actuator 31' has the wing shaft 33' maintained in coaxial rotary relation to the actuator housing tube 38' by the end cap 41' which has the various passages, porting and valving therein. In this instance the wing shaft has its opposite end portions provided with the key fluting 45' by which such end portions are attached to the rigidly connecting bar 32'.

Fluid supply for the actuator 31' is introduced through a radial bore passage 52' and passes by way of an axial passage 55' into one of the subchambers into which the working chamber of the actuator is subdivided by the abutment 39' (FIG. 8) and the wing shaft 40'. Pressure fluid passes through a valve 58' at the intersection of the passages or bores 52'–55' when driving in one rotary direction. When driving in the opposite rotary direction, wherein pressure is introduced through a supply-exhaust passage 54', oriented similarly as the passage 52' in the opposite end cap of the actuator, pressure fluid bleeds through a passage 64' into the area behind the piston valve 65' which thereby closes the supply passage through the valve 58' and forces exhaust passage of hydraulic fluid through the passage port 55' to bypass the valve 58' and pass through a port 67' to unseat a check valve 68' and escape through the bypass duct or passage 69' into the entrance passage 52'. Since the valve 68', similarly as the valve 68 in FIGURES 6 and 7 is adjusted for a predetermined throttled flow condition, a fixed differential is maintained across the actuator in operation. This adjusted, fixed differential is in the single vane actuator effected at each of the opposite ends in similar fashion for opposite directions of rotary actuation, as indicated in FIGURE 8, there being a similar supply-exhaust port and passage and valve arangement, wherein the valves are identified as 58", 65" and 68" at the opposite end of the actuator and corresponding to the same arrangement of passages and valves as identified by the primed reference numerals in FIGURE 9.

The same general arrangement of passages and valves in the end cap as depicted in FIGURE 9 is adaptable for the double vane type of actuator, where the actuator body is held fixedly and the wing shaft rotated in operation, except that the circuitry depicted in FIGURE 7 will be employed.

From the foregoing it will be apparent that the invention provides a new and improved hydraulic control system for rotary actuators in which the control valve means are operative to control flow in the two sided hydraulic system (one side driving and the other side exhausting, alternatively, in each oscillating cycle) as a function of differential pressure across, i.e. between the subchambers in the actuators.

In addition to serving as means for controlling exhausting fluid flow through the associated passage on one side of the hydraulic system, the valve means operate to shut off driving fluid flow through such passage responsive to greater pressure referenced thereto from the other exhausting side of the system, as when a blockage or stoppage, either hydraulic or mechanical occurs. In a hatch cover installation such condition may result from an substruction or abnormal resistance to opening movement of the cover. In other apparatus, similarly, interference with or obstruction to completion of a driving or actuating stroke in the cycle will cause shut-off operation of the valve means. For example, inlet pressure through the passage 52 or 52' will be shut off by the pressure sensitive valve 65 (65') when the reference pressure through the passage 64 (64') is greater; and the check valve 68 (68'') closes the bypass passage.

It will be understood that modifications and variations may be effected without departing from the scope of the novel concepts of the present invention.

I claim as my invention:

1. In a hydraulic rotary actuator construction comprising a body having therein a working chamber with abutment means and a rotary shaft journalled in the body with vane means operable in the working chamber and cooperative with said abutment means to define subchambers within the working chamber:

means providing a two sided hydraulic system for supplying driving hydraulic fluid and exhausting hydraulic fluid alternatively with respect to said subchambers to effect relative oscillations of the shaft and body and including hydraulic circuitry having separate inlet/exhaust passages for said subchamber;

at least one of said passages having flow control valve means operative to control flow to said one passage as a function of fluid pressure differential between said subchambers and comprising a valve which is normally open during supplying of driving hydraulic fluid through said one passage to its subchamber;

and means controllably connecting said valve in referenced relation to the other passage so that if the exhaust fluid pressure therein becomes greater than the supply pressure said valve will close its passage against further supplying of hydraulic fluid, to relieve the actuator of supply pressure load until the exhaust pressure is lower than the supply pressure and releases the valve.

2. A rotary actuator according to claim 1, in which said control valve comprises a free piston one end of which is exposed to the supply fluid pressure and the opposite end of which is exposed to the exhaust fluid pressure.

3. A rotary hydraulic actuator according to claim 1, in which said other passage also has flow control valve means comprising a valve which is normally open during supplying of hydraulic fluid through said other passage and which valve is connected to said one passage, so that if the exhaust pressure becomes greater in said one passage said other passage is closed by said valve until the pressure in said one passage is relieved and reduces to a value below the supply pressure in said other passage.

4. A rotary actuator according to claim 3, in which both of said passages have bypasses around said valves with a check valve in each of the bypasses permitting only exhaust flow through the bypass.

5. A rotary actuator construction as defined in claim 1, in which said control valve means are mounted in said shaft and said hydraulic circuitry is also in said shaft.

6. A rotary actuator construction as defined in claim 1, in which said body has an end closure closing the working chamber and journalling said shaft, and said valve structure and said hydraulic circuitry are in said end closure.

7. In a rotary actuator construction as defined in claim 1, in which said control valve means comprise a piston valve and a bypass around the piston valve including a check valve closed during the supplying driving hydraulic fluid through said one passage and open when said one passage serves to exhaust hydraulic fluid.

8. In a hydraulic rotary actuator construction comprising a body having therein a working chamber with abutment means, and a rotary shaft journalled in the body with vane means operable in the working chamber and cooperative with said abutment means to define subchambers within the working chamber;

means providing a two sided hydraulic system for supplying driving hydraulic fluid and exhausting hydraulic fluid alternatively with respect to said subchambers to effect relative oscillations of the shaft and body and including hydraulic circuitry having separate inlet/exhaust passages for said subchambers;

both of said passages having flow control means therein operative to control the flow of driving hydraulic fluid therethrough and having a bypass around said flow control means, with a check valve in the bypass permitting only exhaust flow through the bypass;

and at least one of said passages having a pressure responsive valve therein which is normally open to permit supply of driving hydraulic fluid to flow through said one passage and with a referencing connection from the other of said passages to said pressure responsive valve for closing the same when the exhaust pressure in said other passage becomes greater than the supply pressure in said one passage.

References Cited

UNITED STATES PATENTS

| | | | |
|---|---|---|---|
| 1,876,104 | 9/1932 | Tucker | 92—122 |
| 2,608,986 | 9/1952 | Stephens | 91—421 |
| 2,642,088 | 6/1953 | Kirkham | 91—421 |
| 2,811,142 | 10/1957 | Shafer | 92—153 |
| 2,864,402 | 12/1958 | Presnell | 91—421 |
| 2,879,745 | 3/1959 | Brown | 91—421 |
| 2,960,070 | 11/1960 | Engelberger | 91—421 |
| 2,960,970 | 11/1960 | Boyle | 91—421 |
| 3,095,906 | 7/1963 | Kolm | 91—421 |

CARROLL B. DORITY, JR., *Primary Examiner.*